United States Patent
Daumal Castellon

(10) Patent No.: US 8,215,200 B2
(45) Date of Patent: Jul. 10, 2012

(54) INTERMEDIATE SHAFT WITH LOW SLIDING LOAD FOR THE STEERING COLUMN OF A MOTOR VEHICLE

(76) Inventor: Melchor Daumal Castellon, Barcelona (ES)

(*) Notice: Subject to any disclaimer, the term of this patent is extended or adjusted under 35 U.S.C. 154(b) by 246 days.

(21) Appl. No.: 10/565,982

(22) PCT Filed: Jan. 25, 2005

(86) PCT No.: PCT/ES2005/000030
§ 371 (c)(1),
(2), (4) Date: Jan. 26, 2006

(87) PCT Pub. No.: WO2005/073052
PCT Pub. Date: Aug. 11, 2005

(65) Prior Publication Data
US 2006/0230865 A1    Oct. 19, 2006

(30) Foreign Application Priority Data
Jan. 28, 2004   (ES) .................................. 200400175

(51) Int. Cl.
*B62D 1/18* (2006.01)
(52) U.S. Cl. ............................ 74/493; 280/775; 464/169
(58) Field of Classification Search .................... 74/492, 74/493; 280/775, 777; 464/162, 169, 89; 403/383, 359.4, 359.5; 384/10, 26, 35, 37, 384/39, 41, 42
See application file for complete search history.

(56) References Cited

U.S. PATENT DOCUMENTS

| | | | | |
|---|---|---|---|---|
| 3,444,753 A | * | 5/1969 | Runkle | 74/493 |
| 4,667,530 A | * | 5/1987 | Mettler et al. | 74/493 |
| 5,152,627 A | * | 10/1992 | Arnold | 403/109.3 |
| 5,348,345 A | * | 9/1994 | Dykema et al. | 280/777 |
| 5,417,614 A | * | 5/1995 | Dykema et al. | 464/162 |
| 5,460,574 A | * | 10/1995 | Hobaugh | 464/162 |
| 5,477,750 A | * | 12/1995 | Korzan | 74/579 R |
| 5,507,203 A | * | 4/1996 | Audibert et al. | 74/492 |
| 5,509,324 A | * | 4/1996 | Cymbal | 74/492 |
| 5,560,650 A | * | 10/1996 | Woycik et al. | 280/777 |
| 5,709,605 A | * | 1/1998 | Riefe et al. | 464/83 |
| 5,964,536 A | * | 10/1999 | Kinoshita | 384/441 |
| 6,099,037 A | * | 8/2000 | Korzan | 280/777 |
| 6,200,225 B1 | * | 3/2001 | Hobaugh, II | 464/167 |
| 6,350,203 B1 | * | 2/2002 | Zernickel | 464/167 |
| 6,942,417 B2 | * | 9/2005 | Schwarzbich | 403/109.1 |
| 7,174,803 B2 | * | 2/2007 | Reiche et al. | 74/493 |

FOREIGN PATENT DOCUMENTS

| | | | |
|---|---|---|---|
| EP | 739806 A2 | * | 10/1996 |
| EP | 0 936 130 A1 | | 8/1999 |
| GB | 2 349 118 A | | 10/2000 |
| JP | 2001027256 A | * | 1/2001 |
| JP | 2001158364 A | * | 6/2001 |

* cited by examiner

Primary Examiner — James Pilkington
Assistant Examiner — Thomas Diaz
(74) Attorney, Agent, or Firm — Blank Rome LLP

(57) ABSTRACT

A low sliding load intermediate shaft comprising a female member slightly receiving a male member and a series of metal strips, such as three, fitted therebetween. The metal strips are retained in position since they are received into the cavities of a fastening cage clamped to the outer surface of the male member. They allow longitudinal movement friction of both members eliminating clearance and radial play with a total effectiveness in torque transmission at any time.

3 Claims, 1 Drawing Sheet

INTERMEDIATE SHAFT WITH LOW SLIDING LOAD FOR THE STEERING COLUMN OF A MOTOR VEHICLE

FIELD OF THE INVENTION

The present invention relates to a low sliding load intermediate shaft in a motor vehicle steering column, which new features provide many advantages, as it will be detailed in the present specification.

BACKGROUND OF THE INVENTION

The steering mechanism of a motor vehicle, provided between the steering wheel and the steering box, comprises an intermediate shaft typically formed basically by a male member or steering column and a female member designed to be telescopically received into the male member.

The main function of the intermediate shaft of the steering column of a motor vehicle is to adjust the position of the steering wheel in depth to adapt it to the driver's size, as well as to act as a safety means allowing the collapse in the event of an accident. Another function of said shaft is to take up vibrations which may arise from the wheels and suspension to the steering wheel. The intermediate shaft performs the function of collapse means so that, in the event of an accident, the male member is collapsed into the female member due to the provision energy absorption means.

The use anti-vibration joints between the male member and the female member responsive to heat may result in a variation in the friction force between both, as the intermediate shaft is provided into the interior space for the engine, which result, in extreme situations, in that the joint does not perform its function as it is either shrunk or its size becomes increased when expanding.

The prior art provides several intermediate shaft configurations, all of them with a view to allow a relative movement between the male member and the female member with controlled sliding load in the event of crash. Therefore, said energy absorption means are provided which allow generating a resistance to the relative movement of the male member and the female member.

A typical configuration of the intermediate shaft consists of a male member and a female member both having a polygonal, for example triangular, cross section between which rollers or balls are provided in contact with the female member inner faces and the male member outer faces for enabling the relative slippage therebetween. Thus, there are always two active faces before a stress with the purpose of achieving a steering system proper operation.

The main disadvantage of this type of configuration is that it is expensive due to the provision of rollers or balls along the male and the female members of the intermediate shaft at the same time determined tolerances is difficult to obtain.

Another disadvantage of this type of state of the art solutions is the high moment of inertia in this type of systems using rollers or balls. The moment of inertia is initially very high and after the impact it is quickly reduced. The initial resistance sensed by the driver at the beginning is too high and consequently the impact absorption effect on the driver is not completely effective.

SUMMARY OF THE INVENTION

The invention intends to significantly simplify the previously described configuration with regard to the prior art by providing a low sliding load intermediate shaft in a motor vehicle steering column with a extremely effective collapse system.

The intermediate shaft provided is of the above described type, that is, comprising a female member adapted to slidingly receive a male member therein, both having a polygonal cross section, relative slip means being provided between said male and female members which, according to the invention, are metal strips. In general, there will be as many metal strips as faces the male member and the female member have. By way of an example, in a triangular shaped cross section structure, there will be three individual metal strips, one for each face.

The metal strips each are fitted between said male member and said female member inside recesses formed in a fastening cage. Said cage is clamped to the male member by means of protrusion-like deformations on the lateral surface thereof. The cage is provided surrounding the outside of the male member and it is arranged inside the female member, retaining efficiently the metal strips in position arranged in the cavities thereof. optionally, the cage may be made of plastic and it may be provided injected directly on the male member.

Said metal strips have uneven contact surfaces intended to put up resistance to the relative axial movement, which will be higher at the beginning of the impact, being subsequently reduced.

Design variables in metal strips are:
surface unevenness;
thickness;
the material from which they are made; and
sheet curvature relative to the plane of one of the male member faces.

These variables are as a function of the resisting load to be provided to the intermediate shaft of the vehicle steering column, according to the requirements (vehicle model and operating conditions).

With an intermediate shaft as that herein described according to the invention it is possible to effectively assure a low load or force by the longitudinal movement of the male member relative to the female member and vice versa and any type of clearances is eliminated without being detrimental to slip between the parts at the same time a total effectiveness in torque transmission at any time is achieved. The invention allows vibration absorption joints to be removed which sensitiveness to variations in temperature results in a undesired gradient in the sliding force when certain required approval technical specifications on the part of motor vehicle manufacturers have to be met.

BRIEF DESCRIPTION OF THE DRAWINGS

The features and the advantages of the low sliding load intermediate shaft in a motor vehicle steering column of the present invention will be clearer from the detailed description of a preferred embodiment thereof which will be given hereinafter by way of a non limitative example, with reference to the drawings herein accompanied, in which.

DETAILED DESCRIPTION OF THE EXEMPLARY EMBODIMENT

Figure 1:
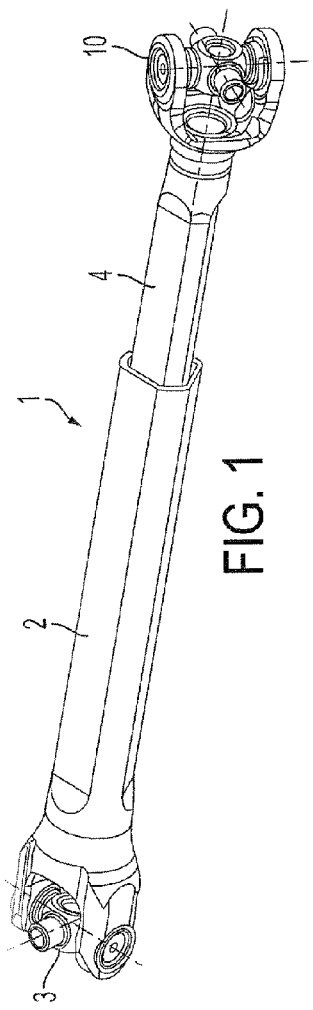
FIG. 1 is a perspective view of an embodiment of a low sliding load intermediate shaft in a motor vehicle steering column according to the invention.

A detailed list of the different parts used for describing the intermediate shaft of the present invention is given below:
(1) intermediate shaft;
(2) female member;
(3, 10) universal joint;
(4) male member;
(7) metal strip;
(10) fastening cage recesses; and
(11) metal strip fastening cage.

One embodiment of a low sliding load intermediate shaft in a motor vehicle steering column has been shown by way of non limitative example in the figures. Said intermediate shaft has been indicated as a whole with the reference numeral (1). The low sliding load intermediate shaft (1) comprises a female member (2) provided, at one end, with a universal joint (3). The female member (2) is hollow so that a male member (4), which is also provided with a corresponding universal joint (10), can be slidingly received therein, through the opposed end.

Figure 2:
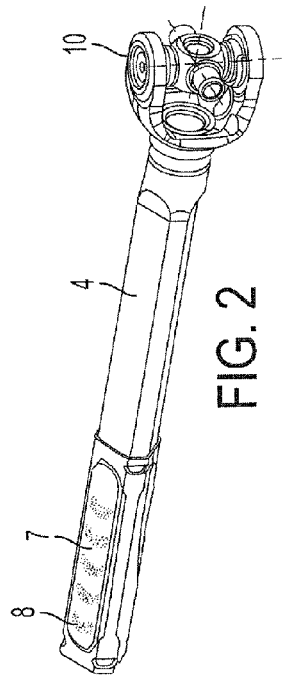
FIG. 2 is a perspective view of the female member of the intermediate shaft of the embodiment in FIG. 1, which is provided with a metal strip fastening cage.
Figure 4:
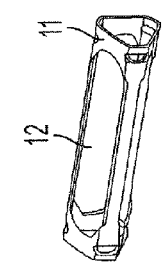
FIG. 4 is a perspective view of the metal strips of the low load intermediate shaft.

The intermediate shaft (1) of the invention is provided with metal strips (7) for relative slip of the female and male members (2, 4), which put up resistance before collapse of the intermediate shaft (1). The metal strips (7) are shown in FIGS. 2, 4 and 6 of the drawings.

Figure 6:
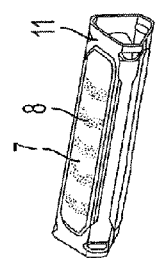
FIG. 6 is a perspective view of the cage of the low sliding load intermediate shaft in FIG. 1 with the metal strips provided therein.
Figure 5:
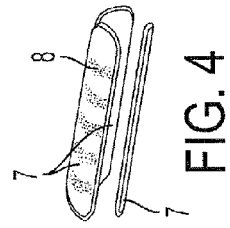
FIG. 5 is a perspective view of the metal strip fastening cage.

The metal strips (7), provided between the male member (4) and the female member (2), are inserted into recesses (12) in a fastening cage (11), as it may be seen from FIGS. 5 and 6. The cage (11) has a cross section complementary to the cross section of the members (2, 4) of the shaft (1), it is provided surrounding the outside of the male member (4), and it is fitted inside the female member (2). The cage (11) is clamped to the male member (4) by means of protrusion-like deformations (not shown) on the lateral surface thereof.

The cage (11) may be metallic or it may be made alternatively of plastic injected directly on the male member (4).

Figure 3:
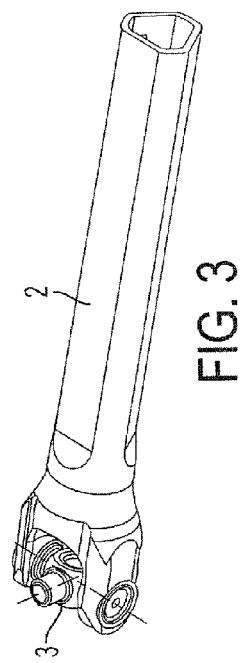
FIG. 3 is a perspective view of the male member of the intermediate shaft of the embodiment in FIG. 1.

As it can be seen from the figures, both the male member (4) and the female member (2) have a substantially triangular cross section with blunt vertexes. It is apparent, however, that both members (2, 4) may have any other type of polygonal cross section according to the invention. This allows the arrangement, in a possible embodiment, of three metal strips (7), as shown in FIG. 3, retained in position by means of the cage (11) having a complementary configuration, as noted above, and as it may be seen from FIGS. 2, 5 and 6, to that of said members (2, 4).

Generally, there will be provided as many metal strips (7) as faces the female member (2) and the male member (4) and, consequently, the cage (11) have. That allows advantageously correcting and taking up any play and clearance, therefore positively influencing on the steering system performance, eliminating anti-vibration and clearance correcting joints which are too responsive to variations of temperature.

As seen in FIGS. 2, 4, and 6, the metal strips (7) have an uneven contact surface (8) with the purpose of putting up resistance to the relative axial movement of both members (2,4). The unevenness of the surface of the metal strip (7), its thickness and the material from which it is made, will depend on the resisting load to be provided to the intermediate shaft (1) of the steering column of the motor vehicle, as per the requirements according to the vehicle model and type as well as the operating conditions thereof.

The telescopic arrangement of the intermediate shaft (1) along with the configuration of the aforedescribed female and male members (2, 4) allow a correct guiding of the vehicle steering column adapting in length to the vehicle type and the operating conditions. The polygonal configuration of the intermediate shaft (1) (triangular in the example shown) allows for assuring a good torque transmission while the three metal strips (7) clamped by the provision of said fastening cage (11) make possible that the intermediate shaft (1) effectively performs the function of collapse, at the same time that they put up a slight resistance to an external stress tending to vary its length with the purpose of adapting to the environment conditions.

In the event of an accident, the male member (4) collapses into the female member (2) thanks to said metal strips (7) acting as energy absorption means.

Once having been sufficiently described what the low sliding load intermediate shaft in a motor vehicle steering column according to the present invention consists according to the enclosed drawings, it is understood that any detail modification can be introduced as appropriate, unless variations may alter the essence of the invention as summarised in the appended claims.

The invention claimed is:

1. A low sliding load intermediate shaft for a motor vehicle steering column, comprising:
   a female member slidingly receiving a male member therein, said female and male members having a substantially triangular shape with blunt vertexes;
   a plurality of metal strips separate from said male member, each of said metal strips having an uneven contact surface, wherein said metal strips are adapted to provide resistance to relative movement between the female and male members due to said uneven contact surfaces of said metal strips, thicknesses of said metal strips, and the relative curvature of each metal strip to a plane of a face of the male member; and
   a continuous fastening cage fitted between said female member and said male member, said fastening cage having sides corresponding to sides of said triangular shape of said female and male members, said fastening cage having a plurality of recesses, each of said recesses being individually arranged on said sides of said fastening cage, respectively, corresponding to said sides of said triangular shape, such that only one recess is located on each side of said fastening cage, and
   wherein each of said metal strips being received in each of said plurality of recesses, respectively, such that said metal strips are distributed one for each of said sides of said triangular shape of said female and male members.

2. A low sliding load intermediate shaft, according to claim 1, wherein
   said cage is clamped to the outside of said male member by deformations on a lateral side thereof.

3. A low sliding load intermediate shaft, according to claim 1, wherein
   said male member has blunt surfaces.

* * * * *